United States Patent [19]

Lippai et al.

[11] Patent Number: 5,245,752
[45] Date of Patent: Sep. 21, 1993

[54] METHOD OF MANUFACTURING A TWO PIECE PISTON

[75] Inventors: Andre Lippai; Jorge K. Tanigami, both of Sao Paolo; Paulo T. Dellanoce, Sao Caetano do Sul, all of Brazil

[73] Assignee: Metal Leve S/A Industria e Comercio, Sao Paulo, Brazil

[21] Appl. No.: 767,047

[22] Filed: Sep. 27, 1991

[30] Foreign Application Priority Data

Sep. 28, 1990 [BR] Brazil .............................. PI 9004990

[51] Int. Cl.$^5$ ............................................. B23P 15/00
[52] U.S. Cl. ........................... 29/888.042; 29/888.044; 123/193 L
[58] Field of Search ..................... 29/888.042, 888.044, 29/428; 123/193.6; 92/186, 255

[56] References Cited

U.S. PATENT DOCUMENTS

| | | | |
|---|---|---|---|
| 4,843,698 | 7/1989 | Ripberger et al. | 29/888.042 |
| 4,847,964 | 7/1989 | Adams et al. | 29/888.042 |
| 5,144,923 | 9/1992 | Leites et al. | 29/888.042 |

Primary Examiner—Irene Cuda
Attorney, Agent, or Firm—Darby & Darby

[57] ABSTRACT

A two-piece, or articulated, piston head for internal combustion engines and the method for obtaining same. The top and pin boss portions composing the head are obtained separately from blanks; the underside of the top portion is provided with a groove whose inner wall is eccentric in relation to the top longitudinal axis; the two portions are joined together by welding; the upper side of the top portion is provided with a combustion bowl eccentric in relation to the top portion longitudinal axis and concentric with the inner wall of the groove on the underside of the top portion.

8 Claims, 1 Drawing Sheet

METHOD OF MANUFACTURING A TWO PIECE PISTON

BACKGROUND OF THE INVENTION

The present invention relates to a two-piece piston, also known as articulated piston, for use in internal combustion engines. More particularly, the invention deals with a method for manufacturing the upper portion, or head, of an articulated piston as well as the piston obtained thereby.

The current trend points to an increasing use of articulated pistons in internal combustion engines, especially in the modern diesel engines which run at high speeds and deliver a high specific output, at the same time that their design is addressed to meet such requirements as low weight, low fuel and lubricating oil consumption, and lower noise and emission levels, these latter features the object of more and more stringent laws in many countries.

In an articulated piston the upper portion, or head, and the lower portion, or skirt, perform independent functions. The skirt is mounted by means of a wrist pin on a pair of pin bosses located at the lower end of members depending from and integral with the head. A gap, or clearance, is maintained between the head lower end and the skirt upper end so that with the piston fitted in the engine there is no contact between the head and the skirt. This prevents the flow of heat from the head to the skirt, thereby allowing the skirt to be mounted with very small skirt-to-cylinder clearances, which brings about a reduction of noise. Moreover, the lateral, or rocking, motion of the articulated piston caused by the connecting rod is reduced. Therefore, that portion of the head provided with the ring grooves can be fitted with small clearances, thereby improving the piston ring stability. This in turn will reduce lubricating oil consumption and minimize blowby.

Owing to the high temperatures generated on the piston top during the combustion process in diesel engines, it is necessary to remove part of the heat from said portion of the piston, especially from the combustion bowl, in order to prevent the formation of thermal cracks which may cause fracture of the top. One well known solution for this problem is to provide the piston with a chamber in which cooling oil circulates. In the articulated piston this chamber is composed of a circumferential recess, or groove, on the head and a tray on the top of the skirt. The cooling medium is supplied to the chamber by a nozzle located at the engine crankcase. The reciprocating travel of the piston causes the cooling oil to splash against the chamber wall, thereby removing part of the heat from the top, especially around the combustion bowl.

There is a basic technical principle of diesel engines under which the center of the combustion bowl on the piston top must be in alignment with the fuel injection nozzle so as to meet combustion efficiency requirements. Thus, the location of the fuel injection nozzle in certain engine designs requires that the combustion bowl be offset from the piston top centerline. In such cases, it is necessary to design the cooling chamber as to ensure an effective cooling, i.e., the thickness of the chamber inner wall, which separates the chamber from the combustion bowl, must be as reduced and uniform as possible. This requires the cooling chamber to be asymmetric in relation to the piston longitudinal axis.

In conventional articulated piston heads, in which the top and pin boss portions are an integral part, the provision of an asymmetric groove on the lower portion is possible only when the part is obtained by casting. However, the casting method has proved inappropriate for making heads having structural properties consistent with the loads imposed on them. For this reason, at present there is a clear preference for the forging method. This method, however, also has a drawback. That is, it is not possible to provide the top lower portion with a groove during the forging operation. Thus, the groove must be made by machining, and then only if it is an axisymmetric chamber. An asymmetric chamber would be unfeasible due to process limitations, as it is impossible for the machining tool to access the region to be machined.

The present invention relates to a piston in which the parts composing the head of an articulated piston namely, the top portion and the pin boss portion, are made separately and then joined together by welding. Said concept is disclosed in Brazilian patent application 8805716.

BRIEF DESCRIPTION OF THE INVENTION

Based on that concept, the present invention relates to a method designed to solve the problem of providing an asymmetric groove on the lower portion of the top of an articulated piston. According to the present invention, the portions composing the head of an articulated piston, i.e., the top and the pin bosses, are made separately. An asymmetric groove is machined on the lower portion of the top and afterwards, the top is joined to the pin bosses by welding.

OBJECTS OF THE INVENTION

It is, therefore, one object of the present invention to provide a method for the manufacture of an articulated piston head whereby the piston top lower portion is provided with a peripheral groove asymmetric in relation to the head longitudinal axis.

It is a further object of the present invention to have an articulated piston head provided with a combustion bowl located asymmetrical in relation to the head longitudinal axis, the underside of the top portion being provided with a peripheral groove asymmetrical to the head longitudinal axis.

BRIEF DESCRIPTION OF THE DRAWINGS

The process of the invention and the product formed thereby is illustrated schematically in the accompanying drawing, to whose numerals the description of a preferred embodiment will refer.

DETAILED DESCRIPTION OF THE INVENTION

Figure 1:
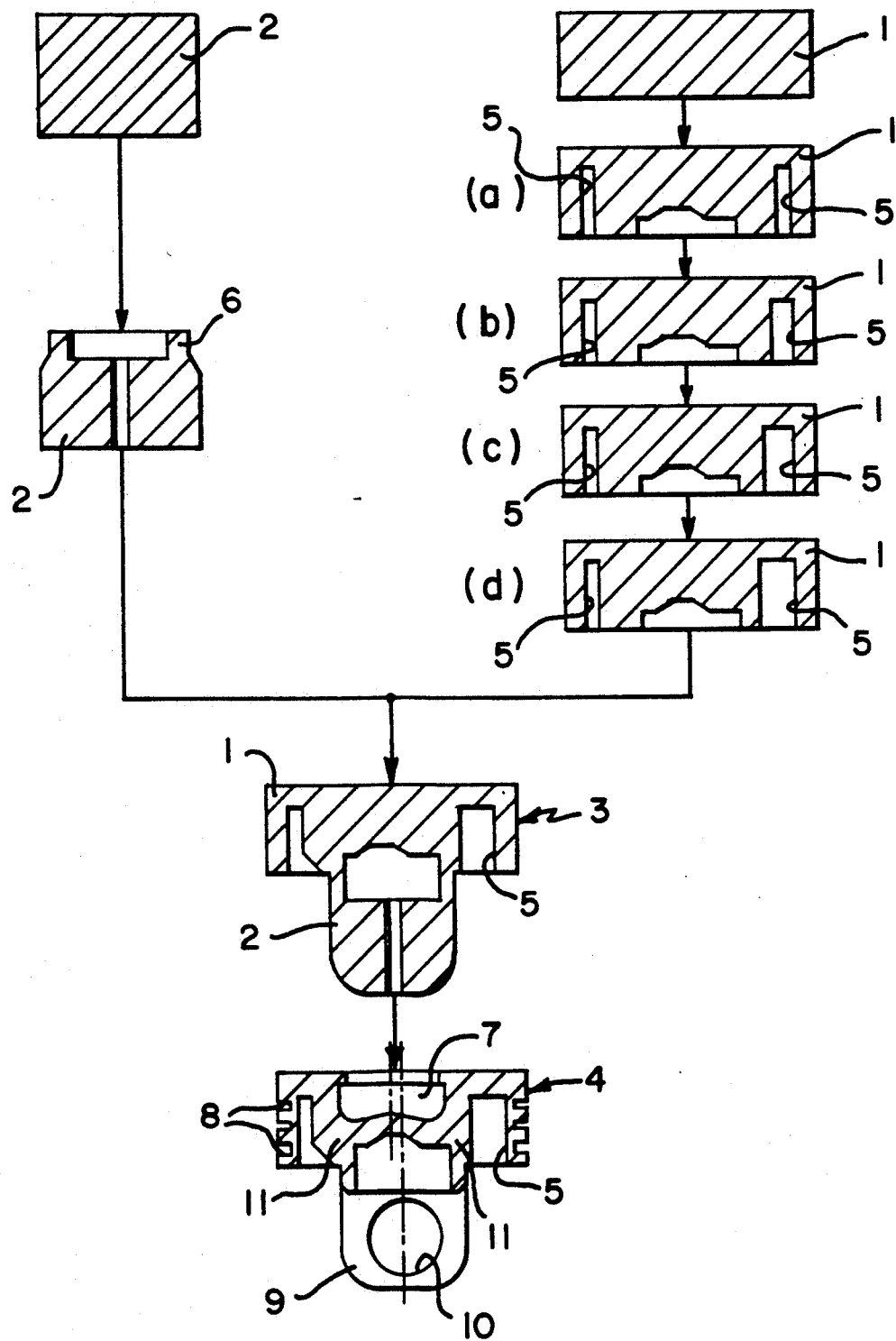

According to the present invention, the figure showing the parts in cross section, a first substantially cylindrical blank 1 is placed and secured to a machining device (not shown) and subjected to a first machining operation to provide an axisymmetric peripheral circumferential groove 5 on the underside of the first blank 1 (step "a"). Thereafter, the first blank 1 secured to said machining device is displaced from its longitudinal axis and subjected to a second machining operation during which, owing to the eccentric position of member 1 in relation to the cutting tool, additional stock from only one part of the groove 5 is removed in the direction of the axis of member 1 (step "b"). If required, additional machining operations can be performed (according to steps "c" and "d"), always with an additional displacement of the center of member 1 until the desired configuration of groove 5 is obtained.

Under separate operations, a second blank 2 is subjected to machining, one of its ends being provided with a recess and, adjacent the recess, with a narrowing of said end thereby defining a rib 6.

Thereafter, members 1 and 2 are joined together by means of welding by juxtaposing rib 6 to the lower central surface of the first member 1, thereby forming the rough head 3 of a two-piece piston. The rough head 3 is then subjected to the last machining operations for the provision of the combustion bowl 7, ring grooves 8, wrist pin bosses 9 and wrist pin holes 10, thus defining the finished head 4.

In this final form, it can be seen that the combustion bowl 7 is located offset of the longitudinal axis of head 4, as well as the annular rib 11 between the combustion bowl 7 and the recess 5 having a substantially uniform thickness. This ensures an optimization of heat removal from said region.

Further, it should be considered that the smaller width of the asymmetric groove imposes a width limitation to the cutting tool. Thus, the greater the amount of asymmetry desired, the greater the number of machining operations required to obtain the asymmetric groove.

After machining of the combustion bowl on the head top portion, the groove inner wall will be concentric with the combustion bowl and define with the combustion bowl wall an annular rib having a reduced and uniform thickness, a feature beneficial to an effective and uniform cooling of that portion of the piston head.

The preferred method for joining together the two members composing the piston head is the friction welding method which carries out the joining without causing the melting of the material of either of the members to be welded. The advantage of the friction welding method lies in the absence of shrinkage porosities as there is no formation of liquid phases during the welding process, which in turn prevents structural changes to the material of the members welded to each other. However, other processes can be employed to perform this welding such as metal inert gas welding (MIG), tungsten insert gas welding (TIG), fusion welding, electrode welding, electron beam welding or laser welding.

The embodiment described and illustrated is a preferred one but not restrictive, therefore it should be appreciated that other embodiments are possible within the spirit and scope of the invention. Thus, for instance, the second blank 2 can be a cast, forged or even sintered member already in its final shape for joining to member 1, whereby the machining operations for the provision of the recess and the rib on member 2 can be dispensed with.

What is claimed is:

1. Method for the manufacture of a two-piece piston head comprising the steps of:
   providing a first blank having a substantially cylindrical shape;
   first machining an axisymmetric circumferential groove having inner and outer walls on one face of said first blank within its outer periphery;
   displacing the said first blank from its longitudinal axis on which said circumferential groove was machined;
   performing at least one additional machining operation and said circumferential groove by removing additional material from only part of a wall thereof;
   providing a second blank;
   forming on one face of said second blank a circular raised rib which surrounds a recess; and
   joining said one face of said first blank to said one face of said second blank by juxtaposing said rib of said second blank to said one face of said first blank, said first blank and said second blank joined together forming the rough head of said piston.

2. The method of claim 1 further comprising the step of subjecting said rough head to machining to provide a combustion bowl on the other face of said first blank concentric with the inner wall of said circumferential groove.

3. The method of claim 1 further comprising the step of:
   subjecting said rough head to final machining operations to provide ring grooves, pin bosses and wrist pin holes.

4. The method of claim 1, wherein the joining of said first blank to said second blank is performed by friction welding.

5. The method of claim 1 wherein said first blank is placed on a holding device prior to said step of first machining, and said at least one additional machining operation is carried out by first moving said holding device.

6. A method as in claim 1 wherein the step of forming said second blank is carried out by machining.

7. The method of claim 1 wherein said step of performing at least one additional machining operation comprises removing material of said first blank only from the inner wall of said groove.

8. The method of claim 7 further comprising the step of subjecting said rough head to machining to provide a combustion bowl on the other face of said first blank concentric with the inner wall of said circumferential groove.

* * * * *